United States Patent
Baker et al.

(10) Patent No.: US 8,562,252 B2
(45) Date of Patent: Oct. 22, 2013

(54) SYSTEMS FOR TREATING CONTAMINATED MATERIALS

(75) Inventors: Ralph S. Baker, Fitchburg, MA (US); James P. Galligan, Medway, MA (US); Gorm Heron, Keene, CA (US)

(73) Assignee: TerraTherm, Inc., Fitchburg, MA (US)

( * ) Notice: Subject to any disclaimer, the term of this patent is extended or adjusted under 35 U.S.C. 154(b) by 63 days.

(21) Appl. No.: 13/403,780

(22) Filed: Feb. 23, 2012

(65) Prior Publication Data
US 2012/0214119 A1    Aug. 23, 2012

Related U.S. Application Data

(62) Division of application No. 12/511,682, filed on Jul. 29, 2009, now Pat. No. 8,348,551.

(51) Int. Cl.
*B09C 1/06* (2006.01)

(52) U.S. Cl.
USPC ............... 405/128.85; 405/128.7; 588/16; 209/370

(58) Field of Classification Search
USPC ............... 405/128.1–128.85; 588/17, 320; 209/370
See application file for complete search history.

(56) References Cited

U.S. PATENT DOCUMENTS

| | | |
|---|---|---|
| 3,974,784 A | 8/1976 | Greenberg |
| 4,323,367 A | 4/1982 | Ghosh |
| 5,213,445 A | 5/1993 | Ikenberry et al. |
| 5,228,804 A | 7/1993 | Balch |
| 5,249,368 A | 10/1993 | Bertino et al. |
| 5,318,116 A | 6/1994 | Vinegar et al. |
| 5,324,137 A | 6/1994 | Dash |
| 5,514,286 A | 5/1996 | Crosby |
| 5,563,066 A | 10/1996 | Buchanan |
| 5,660,500 A | 8/1997 | Marsden, Jr. et al. |
| 5,753,109 A | 5/1998 | Looney et al. |
| 5,836,718 A | 11/1998 | Price |

(Continued)

FOREIGN PATENT DOCUMENTS

| | | |
|---|---|---|
| JP | 0929924 | 11/1997 |
| WO | 0178914 | 10/2001 |

(Continued)

OTHER PUBLICATIONS

Mobile Environmental Technologies, Inc "Corporate Overview." May 2006. (15 pages).

(Continued)

*Primary Examiner* — Tara M. Pinnock
(74) *Attorney, Agent, or Firm* — Meyertons, Hood, Kivlin, Kowert & Goetzel, P.C.; Eric B. Meyertons

(57) ABSTRACT

Systems for treating contaminated soil are described herein. One system includes a soil chamber that includes one or more walls and at least one floor; at least one heater attached to or inside of at least one of the walls; and at least one heater coupled to or in the floor. Two or more of the walls enclose an interior of the soil chamber. At least one of the walls is configured to move between a closed position during heating of the soil chamber, and an open position that allows a soil moving vehicle to access an interior of the soil chamber to provide or remove soil to and from the soil chamber. At least one wall heater and at least one floor heater provide heat that transfers from the heaters to the contaminated soil in the soil chamber.

23 Claims, 7 Drawing Sheets

(56) References Cited

U.S. PATENT DOCUMENTS

| | | |
|---|---|---|
| 6,000,882 A | 12/1999 | Bova et al. |
| 6,534,306 B1 | 3/2003 | Allen |
| 6,596,142 B2 | 7/2003 | McGee |
| 6,789,353 B2 | 9/2004 | Smullen et al. |
| 6,829,844 B2 | 12/2004 | Brady et al. |
| 6,881,009 B2 | 4/2005 | Stegemeier et al. |
| 7,004,678 B2 | 2/2006 | Stegemeier et al. |
| 7,220,365 B2 | 5/2007 | Qu et al. |
| 7,410,576 B2 | 8/2008 | Brouillard et al. |
| 7,534,926 B2 | 5/2009 | Stegemeier et al. |
| 7,866,920 B2 | 1/2011 | Richter |
| 7,975,851 B2 | 7/2011 | Kossowan et al. |
| 8,037,617 B2 | 10/2011 | Kossowan |
| 2004/0228690 A1 | 11/2004 | Stegemeier et al. |
| 2004/0240942 A1 | 12/2004 | Richter |
| 2006/0171780 A1 | 8/2006 | Richter |
| 2008/0190818 A1 | 8/2008 | Dana et al. |

FOREIGN PATENT DOCUMENTS

| | | |
|---|---|---|
| WO | 03035290 | 1/2003 |
| WO | 2004052566 | 6/2004 |
| WO | 2005120737 | 12/2005 |

OTHER PUBLICATIONS

Baker et al., In-pile thermal desorption of PAHs, PCBs, and dioxins/furans in soil and sediment, International Symposium and Exhibition on the Redevelopment of Manufactured Gas Plant Sites, England, 2006, pp. 1-13.

PCT International Search Report and Written Opinion for International Patent Application No. PCT/US2010/043394 mailed Apr. 28, 2011.

SYSTEMS FOR TREATING CONTAMINATED MATERIALS

PRIORITY CLAIM

This application is a divisional application of U.S. application Ser. No. 12/511,682 entitled "METHOD AND SYSTEM FOR TREATING CONTAMINATED MATERIALS" to Baker et al., filed Jul. 29, 2009 now U.S. Pat. No. 8,348,551.

BACKGROUND

1. Field of the Invention

The present invention generally relates to soil remediation systems and methods. More particularly embodiments of the present invention relate to systems and method for In-Pile Thermal Desorption (IPTD) in a wall and/or floor heated chamber.

2. Description of Related Art

Soil contamination is a matter of concern in many locations. "Soil" refers to unconsolidated and consolidated material in the ground, and to sediment in water bodies such as rivers, harbors and estuaries. Soil may include natural formation material such as dirt, sand, and rock, as well as fill material. Soil may be contaminated with chemical, biological, and/or radioactive compounds. Dealing with these types of contaminants of concern (COCs) so as to protect human health and the environment represents a challenge to modern society.

There are many ways to remediate contaminated soil. "Remediating soil" means treating the soil to reduce contaminant levels or mobility within the soil or to remove contaminants from the soil. Ex situ methods of remediating contaminated soil typically include excavating the soil and then processing the soil in an on-site or off-site treatment facility to reduce contaminant levels within the soil or to remove contaminants from the soil. Alternatively, contaminated soil may not be excavated but instead remediated in place, which is termed "in situ remediation".

During remediation heat added to contaminated soil may raise the temperature of the soil above vaporization temperatures of soil contaminants. If the soil temperature exceeds a vaporization temperature of a soil contaminant, some or all of the contaminant will vaporize. Thermal desorption is a soil remediation process that involves in situ or ex situ heating of contaminated soil. Heating the soil may reduce soil contamination by processes including, but not limited to, vaporization and vapor transport of contaminants from the soil (e.g., steam distillation), entrainment and removal of contaminants in water vapor and/or a gas stream, thermal degradation (e.g., by pyrolysis and/or hydrolysis), and/or conversion of contaminants into other compounds by oxidation or other chemical reactions within the soil. During thermal remediation, a vacuum may be applied to the soil to remove off-gas and/or other fluids from the soil. The off-gas and other fluids may be directed to a storage tank or treatment facility and processed to remove contaminants from the extracted fluids or to reduce contaminant levels within the fluids.

Soil may be heated by a variety of methods, both in situ and ex situ. Methods for heating soil include, but are not limited to, heating by direct firing, convection (e.g., rotary kiln), heating substantially by thermal conduction, heating by steam injection, heating by radio frequency heating, or heating by electrical soil resistivity heating. Thermal conductive heating ("TCH") may be advantageous because the temperature obtainable by thermal conductive heating is not dependent on an amount of water or other polar substance in the soil. Soil temperatures substantially above the boiling point of water may be obtained using thermal conductive heating, if needed. Soil temperatures of about 100° C., 200° C., 300° C., 400° C., 500° C. or greater may be obtained using thermal conductive heating. By achieving such temperatures, a very wide range of organic contaminants and some metals (e.g., mercury) can be treated and substantially if not completely removed from the soil.

Increasingly, excavation and offsite disposal of these contaminants, which involves transferring the contamination to another location, such as a landfill, is regarded as too costly and detrimental from a liability standpoint. In-Pile Thermal Desorption (IPTD) is an emerging technology that treats contaminated soil, sediment or other material in batches. Soil piles or treatment cells are typically built with heaters or heat pipes installed within the soil volume, after which the piles or cells are covered. The piles or cells are then heated to the target temperature, and when the goals have been reached, the treated soil is removed as the heating system is dismantled and moved out of the way. Completing a full cycle of this process typically takes less than two months. IPTD can be carried out onsite and is relatively insensitive to the presence in the waste of high moisture and organic contents, fine particles, and rocks or debris.

U.S. Patent Publication 2004/0228690 by Stegemeier et al., U.S. Pat. No. 6,881,009 by Stegemeier et al., U.S. Pat. No. 7,004,678 by Stegemeier et al., and U.S. Pat. No. 7,534,926 by Stegemeier et al., the entirety of each is herein incorporated by reference as if fully set forth herein, describes systems and methods for heating contaminated soil.

Current IPTD techniques may include certain difficulties and challenges, such as installing or removing the heating system and gas inlet/vacuum piping inside the soil volume without later damaging them, readily accessing an interior of the cell with a soil loading vehicle, such as a bulldozer or dump truck used to deposit and/or remove the soil without first dismantling each heater or assembly of heaters. Other treatment techniques that include heating the soil through injection of a fluid such as hot gas can result in uneven heating due to preferential flow of the hot gas through higher permeability pathways (e.g., sandy seams, fractures between silty/clayey blocks or aggregates, voids), and bypassing of lower permeability zones, exemplified by silty/clayey blocks or aggregates.

SUMMARY

Various embodiments of soil remediation systems and related apparatus, and methods of operating the same are described. In one embodiment, provided is a method for treating contaminated soil. The method includes providing contaminated soil in a soil chamber that has at least one wall and at least one floor, at least one heater coupled to or inside of at least one of the walls and at least one substantially elongated floor heater coupled to or in the floor. At least one of the walls at least partially includes a thermally conductive material configured to transfer heat from at least one of the heaters to an interior of the soil chamber. Two or more of the walls enclose an interior of the soil chamber. At least one of the walls and/or the floor can move between a closed position during heating of the soil chamber, and an open position that allows a soil moving vehicle to access an interior of the soil chamber to provide soil to or remove soil from the soil chamber. The method also includes heating the contaminated soil within the soil chamber to substantially reduce the level of contaminants in the contaminated soil.

In another embodiment, provided is a soil treatment system. The system includes a soil chamber that has at least one wall and at least one floor, at least one heater coupled to or inside of at least one of the walls and at least one substantially elongated floor heater coupled to or in the floor. At least one of the walls at least partially includes a thermally conductive material configured to transfer heat from at least one of the heaters to an interior of the soil chamber. Two or more of the walls enclose an interior of the soil chamber. At least one of the walls and/or the floor can move between a closed position during heating of the soil chamber and an open position that allows a soil moving vehicle to access an interior of the soil chamber to provide or remove soil to and from the soil chamber.

In yet another embodiment, provided is a contaminated soil treatment system that includes a soil chamber for containing soil during use. The soil chamber includes at least two substantially elongated heaters and one or more heat conducting plates disposed between one or more of the substantially elongated heaters and the interior of the chamber such that one or more of the substantially elongated heaters is in contact or near contact with the heat conducting plates. A majority of heat provided to the soil chamber originates from one or more of the substantially elongated heaters that are separated from the interior of the soil chamber by one or more heat conducting plates. At least one of the walls and/or the floor can move between a closed position during heating of the soil chamber, and an open position that allows a soil moving vehicle to access an interior of the soil chamber to provide soil to or remove soil from the soil chamber.

BRIEF DESCRIPTION OF THE DRAWINGS

Advantages of the present invention will become apparent to those skilled in the art with the benefit of the following detailed description and upon reference to the accompanying drawings in which.

Figure 1:
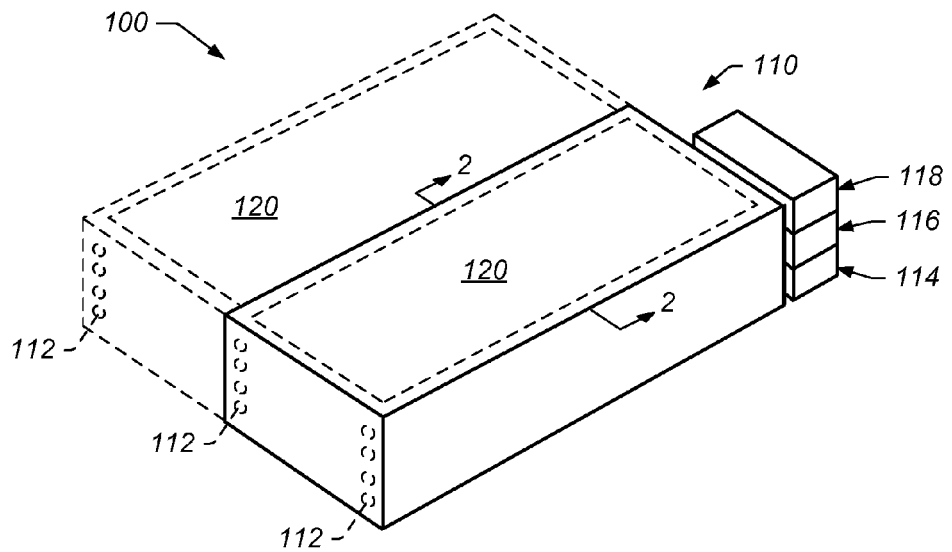
FIG. 1 is a diagram that illustrates a soil treatment system including a soil chamber system having heaters installed within its walls in accordance with one or more embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, certain embodiments of the present technique include a system and method for remediation of soil. Embodiments include In-Pile Thermal Desorption (IPTD) techniques to remove contaminants from the soil. In certain embodiments, a soil treatment system includes a soil chamber used to heat the soil. In some embodiments, heaters are installed in the walls and/or floors of the soil chamber. In some embodiments, at least a portion of the walls and/or floors include (e.g., the walls and/or floor are attached to or made of) a thermally conductive layer that is positioned between the heaters and an interior of the soil chamber and/or the soil contained therein. In some embodiments, the thermally conductive layer includes one or more metal plates or sheets. The thermally conductive layer transfers heat from the heaters to the soil during use. In some embodiments, multiple soil chambers are provided adjacent one another such that adjacent chambers share a common wall. In some embodiments, the chamber includes one or more movable walls that allow soil moving equipment to access an interior of the soil chamber for the deposition and removal of soil. In some embodiments, the soil treatment system includes a ventilation system that allows the flow of gas into and out of the soil chamber during use. In some embodiments, the soil chamber includes a fluid collection system for injecting, trapping, or removing condensate or other fluids. During use, heating of the soil chamber provides a desired distribution of heat to the contaminated soil to effectively provide for the removal of contaminants. Further, in certain embodiments, the location of heaters within the walls and/or floors enables soil loading and unloading equipment (including but not limited to vehicles such as front-end loaders, bulldozers and dump trucks) to work without significant restrictions within the interior of the soil chamber.

FIG. 1 is a diagram that illustrates a soil treatment system 100 including a soil chamber system 110 having heaters 112 installed within its walls, in accordance with one or more embodiments of the present technique. Soil treatment system 100 includes soil chamber system 110, a ventilation system 114, a fluid system 116, and a control system 118. Soil treatment system 100 may be used to heat soil to remove contaminants therein.

Soil chamber system 110 may include one or more soil chambers for the remediation of soil. For example, as illustrated in dashed lines, soil chamber system 110 may include more than one soil chamber 120. Each soil chamber 120 includes an enclosed region in which a pile of soil can be deposited. In one embodiment, soil is deposited into soil chamber 120, heaters 112 transfer heat into the soil, raising the soil's temperature to a target level, certain contaminants are vaporized and removed and treated via the ventilation system 114, runoff fluids may be collected and treated via fluid system 116, and the remediated soil is cooled and removed from the soil chamber.

Ventilation system 114 may be used to inject gas into soil chamber system 110 and soil contained therein. The injection of gas such as air may facilitate oxidation and removal of contaminants during heating. In one embodiment, a ventilation system 114 is capable of providing a vacuum to soil chamber system 110. The vacuum may remove vaporized contaminants from the soil and transport the vapors to an off-gas treatment system. In the illustrated embodiment, ventilation system 114 includes one or more conduits in communication with soil chamber system 110 for supplying gas to and removing gas from the soil chamber system 110. As described in more detail below, ventilation system 114 may include one or more conduits positioned internally to soil chamber system 110, such as ventilation conduits, inlets, outlet, and screens. In one embodiment, components of ventilation system 114 are installed in the walls and/or floor of soil chamber 120 of soil chamber system 110. Positioning a portion of the ventilation system in the walls may enable injected gas to be distributed into the soil from one or more interior walls of soil chamber 120, and/or gas to be removed (e.g., vacuumed) from one or more interior walls of soil chamber 120 with minimal impact to filling or emptying the soil chamber 120.

In one embodiment, ventilation system 114 includes an off-gas collection piping system and treatment system. The off-gas collection piping may be un-heated piping that conducts off-gas and condensate to the treatment facility. Alternatively, the off-gas collection piping may be heated piping that inhibits condensation of off-gas within the collection piping. In some embodiments, off-gas collection piping may be or may include metal piping, fiberglass piping, polymer piping, flexible hose, or the like. The off-gas collection piping system may be utilized for transporting the off-gas removed from the soil to the off-gas treatment system for polishing. The off-gas treatment system may remove or destroy contaminants within the off-gas to acceptable levels. The off-gas treatment facility may include a reactor system, such as a thermal oxidizer, to eliminate contaminants or to reduce contaminants within the off-gas to acceptable levels. Alternatively, the treatment system may use a mass transfer system, such as passing the off-gas through activated carbon beds, to eliminate contaminants or to reduce contaminants within the off-gas to acceptable levels. Alternatively, the off-gas treatment system may include a condensing system to condense contaminants and water out of the off-gas stream for subsequent treatment and/or disposal. A combination of a reactor system and a mass transfer system may also be used to eliminate contaminants or to reduce contaminants within the off-gas to acceptable levels.

Fluid system 116 may be used to introduce fluids to or remove fluids from the soil contained in soil chamber system 110. In one embodiment, fluid system 116 may be used to provide water for cooling the soil after heating and contaminant removal. For example, fluid system 116 may provide water to quench high soil temperature. In one embodiment, the soil pile is uncovered, fluid system 116 sprays water on the top of, and/or within the body of the uncovered soil pile or delivers water via gas inlet/vapor extraction piping of ventilation system 114 that are at least partially located in the walls of the soil chamber, or a separate conduit system. As water is added to the heated soil, it may flash to steam, producing an innocuous and diffuse vapor plume. In one embodiment, water may be added to soil to reintroduce moisture into the soil that may be dry (e.g., non-cohesive and therefore difficult to handle) after being heated.

In one embodiment, fluid system 116 includes, liners, channels, drains, conduit, pumps and the like that can be used to inject and/or remove fluids from soil chamber system 110. In one embodiment, fluid system 116 includes drains and pumps (e.g., a sump pump) that collect and remove liquids that accumulate at the bottom of the soil chamber, also referred to as leachate. In one embodiment, the collected fluids may be routed to a leachate treatment system for treatment of the fluids. In one embodiment, a lower portion of soil chamber 120, such as a floor, may slope and include a drain and/or pump that allows for the removal of leachate.

Control system 118 may include instrumentation and power control systems used to monitor and control the soil chamber 110, ventilation system 114, and/or fluid system 116. In one embodiment, control system 118 is used to monitor and control the heating rate of soil chamber 110. For example, electrical heaters of soil chamber system 110 may require controllers to adjust and control the power to the heaters. The type of controller may be dependent on the type of electricity used to power the heaters. For example, a silicon controlled rectifier may be used to control power applied to a heater. In one embodiment, control system 118 monitors and controls the vacuum applied to the soil and the operation of the off-gas treatment system. In some embodiments, the use of controllers may not be necessary.

Figure 2A:
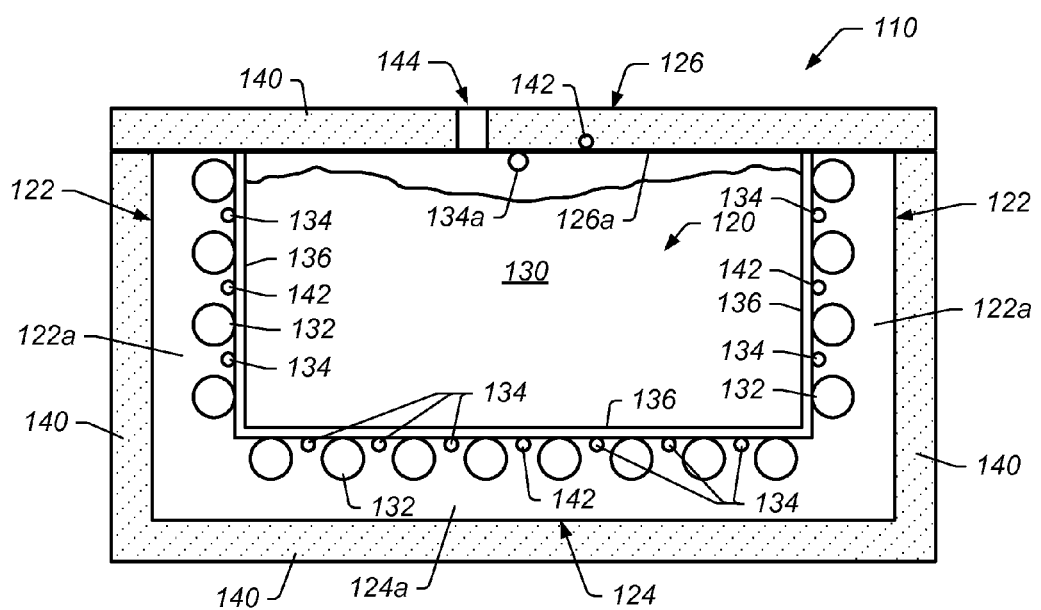
FIG. 2A is a cross-section view of the soil chamber system taken across line 2-2 of FIG. 1 in accordance with one or more embodiments of the present technique.

FIG. 2A is a cross-section view of soil chamber system 110 taken across line 2-2 of FIG. 1, in accordance with one or more embodiments of the present technique. In the illustrated embodiment, soil chamber system 110 includes soil chamber 120, having soil chamber walls 122, soil chamber floor 124, soil chamber cover 126, and soil 130. In one embodiment, soil chamber 120 may have an interior width that is greater than about two meters and a height that is greater than about one meter. In one embodiment, soil chamber 120 may be rectangular shaped having a width of about five meters, a length of about thirty meters, and a height of about four meters.

In the illustrated embodiment, walls 122 and floor 124 include heaters 132, vents 134, and a thermally conducting layer 136. Thermally conducting layer 136 is positioned between heaters 132 and soil 130. In the illustrated embodiment, thermally conducting layer 136 inhibits contact between heaters 132 and soil 130. In one embodiment, heaters 132 are in contact or near contact with thermally conducting layer 136 such that heat is transferred to the thermally conducting layer 136 via conduction. Thus, substantially all of the heat transferred from heater 132 to thermally conducting layer 136 is transferred via thermal conduction. During heating, heat may be transferred from heater 132, flow conductively through the plane containing the thermally conducting layer 136, and into soil 130. In one embodiment, thermally conducting layer 136 includes a planar member/ surface of wall 122 that distributes heat. Thus, the combination of heater 132 and thermally conducting layer 136 may provide a planar heat source, as opposed to a linear heat source that may otherwise be provided by narrow elongate heaters 132 that are not separated from soil 130 via a planar conducting layer.

Thermally conducting layer 136 may include a planar member, such as a metal (e.g., carbon steel or stainless steel) plate or sheet. In one embodiment, thermally conducting layer 136 may include a plurality of sheets, plates, or strips. In one embodiment, thermally conductive layer includes plates that cover a substantial area of the interior of wall 122. In one embodiment, thermally conducting layer 136 includes strips (e.g., elongate sheets of metal) that are provided along a length of the interior of wall 122. The strips may run adjacent to each of heaters 132 in one embodiment. For example, an interior surface of soil chamber walls 122 and/or floor 124 may include multiple elongated sheets extending along the length of soil chamber 120 proximate one or more of the heater locations.

In the illustrated embodiment, thermally conducting layer 136 forms the interior surface of soil chamber 120. For example, thermally conducting layer 136 is positioned on an interior surface of walls 122 and/or floor 124 such that it is in direct contact with soil 130. In one embodiment, conducting layer 136 spans more than about ten percent, twenty-five percent, fifty percent, seventy-five percent or a majority of the wall surface area at the interior of chamber 120. In other embodiments, additional layers of walls 122 and/or floor 124 may be positioned between thermally conducting layer 136 and the interior of soil chamber 120 and/or soil 130 contained in soil chamber 120. For example, thermally conducting layer 136 may include an interior layer of walls 122 and/or floor 124 wherein a coating, another layer of wall 122, an additional thermally conducting plate, or a combination thereof is positioned between thermally conductive layer 136 and the interior of soil chamber 120 and/or soil 130 contained in soil chamber 120.

Thermally conducting layer 136 may be formed to promote the conduction of heat from heaters 132 to soil 130. In one embodiment, thermally conducting layer 136 has a thermal conductivity that is about the same or greater than that of soil, carbon steel, and/or aluminum. For example, thermally conductive layer 136 may be formed of concrete, carbon steel, stainless steel, aluminum, copper or a composite material having a sufficient effective thermal conductivity. The thermal conductivity may be greater than other materials proximate an exterior of wall 122 such that thermal conduction is promoted inward into the soil as opposed to outward toward an exterior of soil chamber system 110.

Any number of heaters 132 may be provided in walls 122 and/or floor 124. In the illustrated embodiment, four heaters 132 are provided in wall 122 and eight heaters 132 are provided in floor 124. Other embodiments may include one, two, three, five, six, seven, eight, nine, ten or more heaters in wall 122 and/or floor 124. For example, two elongate heaters may be provided in each wall 122 and/or each floor 124 of soil chambers 120.

Heaters 132 may be arranged such that heat is distributed substantially evenly to thermally conducting layer 136. In an embodiment, heat can be conducted via thermally conducting layer to provide a relatively even distribution of heat to soil 130. In one embodiment, heaters 132 are spaced from about one meter (1 m) to about two meters (2 m) from one another. Other embodiments may include any suitable spacing between heaters 132. For example, heaters 132 may be spaced about 0.1 m, 0.2 m, 0.3 m, 0.4 m, 0.5 m, 0.6 m, 0.7 m, 0.8 m, 0.9 m, 1.5 m, 2.5 m, 3 m or more apart. In the illustrated embodiment, heaters 132 are evenly spaced from one another along the height of wall 122 and width of floor 124. Other embodiments may include uneven spacing, graduated spacing, or the like. Various spacing may be used to help even out the distribution of heat transferred to soil 130. For example, more heaters may be placed near a lower portion of wall 122 and/or floor 124 to account for heat rising through soil 130 during heating.

Figure 6:
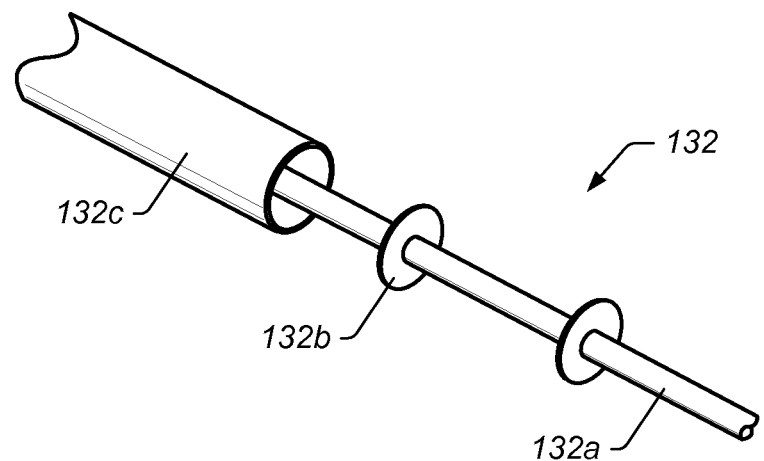
FIG. 6 is a diagram that illustrates a heater in accordance with one or more embodiments of the present technique.
Figure 7:
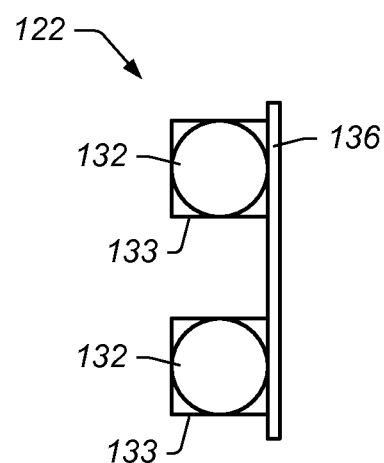
FIG. 7 is a diagram that illustrates a heater arrangement in accordance with one or more embodiments of the present technique.

Heaters 132 may include any variety of heating devices. For example, heaters may include electrically powered heaters, gas heaters, pressurized high-temperature steam lines, or any other suitable heat source. Heaters 132 may include commercial nichrome/magnesium oxide tubular heaters with Inconel 601 sheaths operated at temperatures up to about 1250° C. Alternatively, heaters 132 may include silicon carbide or lanthanum chromate "glow-bar" heater elements, carbon electrodes, or tungsten/quartz heaters could be used for still higher temperatures. In one embodiment, heaters 132 are elongated heaters. Elongate heaters 132 may include an elongate rod that is capable of being slid into housing. In one embodiment, as depicted in FIG. 6, heaters 132 include an elongate solid 310 stainless steel rod 132*a* having a diameter of about three-eighths of an inch or a 400-series stainless steel rod 132*a* having a diameter of approximately one inch, and having ceramic spacers/disc 132*b*, and that can be placed (e.g., slid) into a housing 132*c* having an internal width of about three inches. Housing 132*c* may be inserted into and/or coupled to wall 122 and/or floor 124.

Returning to FIG. 2A, in the illustrated embodiment, elongated heaters 132 run horizontally along the wall 122, substantially parallel with a surface of walls 122, floor 124 and ground. In other words, elongated heaters run perpendicular to the plane of the page when viewing FIG. 2A. In one embodiment, heaters 132 include two or more heaters coupled to one another to form an elongated heater. For example, where a wall is fifty meters in length, two twenty-five meter heaters may be coupled to one another to form a single fifty meter elongated heater 132 that spans substantially all of the length of the wall.

In the illustrated embodiment, one or more heaters 132 are arranged substantially horizontally along a length of walls 122 and are completely contained within walls 122 such that they do not extend into an interior of soil chamber 120. In one embodiment one or more heaters 132 may be arranged vertically, or at any other angle within walls 122 and/or floor 124. For example, one or more of heaters 132 may be oriented vertically or at an angle. In some embodiments, heaters 132 may reside partly within the walls 122 and partly beyond the plane of soil chamber 120. For example, one or more heaters 132 may intrude width-wise partly from walls 122 into an interior of soil chamber 120. In some embodiments, one or more additional heaters, and/or portions of heaters 132 may reside in an interior of soil chamber 120.

Heaters 132 may include at least a portion of their surface (e.g., a heating element or housing) in direct contact with thermally conducting layer 136. In one embodiment heaters 132 are urged into contact via a mechanical fastener, such as a clamp, or a biasing mechanism, such as a spring. In one embodiment, heaters 132 are adhered to thermally conducting layers 136 walls via an adhesive or similar layer. Direct contact or near contact between heaters 132 and steel plate may provide for an efficient transfer of heat to thermally conducting layer 136. In one embodiment an enclosure around the heating element may help to direct radiant heat to thermally conducting layer 136.

Vents 134 include paths for the flow of fluids into and out of soil chamber 120. In one embodiment, vents 134 include conduit that extend through wall 122 and/or floor 124 and that terminate into soil chamber 120. In one embodiment, vents 134 include conduit in communication with openings in an interior of walls 122 and/or floor 124. In other embodiments, the portions of vents 134 that face the soil are composed of porous concrete, metal screen or perforated channels. Vents 134 and associated conduits may be portions of ventilation system 114 and/or fluid treatment system 116. Vents 134 may be used for the flow or injection of air or other gases into soil chamber 120, the flow or vacuum of gas out of soil chamber 120, the flow or injection of liquids, such as water, into soil chamber 120 and the flow or pumping of liquids, such as water, out of soil chamber 120. In the illustrated embodiments, a vent 134*a* is depicted provided above the pile of soil 130 in chamber 120. Vent 134*a* may be coupled to and/or integral with soil chamber cover 126. Vent 134a may be located in the soil pile. Vent 134a may include a conduit/passage for vacuuming off-gas from soil chamber 120 and/or for the flow of gas into and out of soil chamber 120. In one embodiment, vent 134 includes a conduit/passage that extends through an end wall that extends between side walls 122. Vent 134 may include a conduit/passage that terminates at or near a surface of the wall or that extends into soil chamber 120.

Walls 122 and/or floor 124 may include various arrangements to provide for the location and retention of components, such as heaters 132, vents 134, and thermally conducting layer 136. In one embodiment, walls 122 include a hollow framed region. For example, in the illustrated embodiment, a central portion 122a of walls 122 and a central portion 124a of floor 124 are substantially void of material. At least a portion of an interior/chamber side of wall 122 and/or floor 124 is formed by thermally conducting layer 136, and heaters 132 and vents 134 are positioned in the central region 122a/124a on or near an exterior side of thermally conducting layer 136. In one embodiment, central portion 122a/124a includes structural components, such as a solid material positioned therein, that forms a portion of wall 122. For example, in one embodiment, central portion 122 may be formed from concrete, having heater 132 and/or vents 134 positioned therein and thermally conducting layer 136 positioned proximate an interior surface of soil chamber 120. In one embodiment, walls 122 may include metal structures and/or supports. For example, in one embodiment, walls 122 may include sheet pile. Sheet pile may include corrugated steel panels that are interlocked or welded to one another.

Soil chamber system 110 may include insulation 140. Insulation 140 may be used to inhibit the loss of heat from soil chamber 120. For example, during heating of soil 130 in soil chamber 120, insulation 140 may help to inhibit heat from escaping via walls 122, floor 124, soil chamber cover 126 or similar portion of soil chamber system 110. Insulation 140 may help to direct heat from heaters 132 toward conducting plate 136 and the interior of soil chamber 120.

In the illustrated embodiment, insulation 140 is positioned on an exterior of walls 122 and floor 124. Insulation 140 may include mineral wool, fiberglass and/or perlite, vermiculate, light weight insulating concrete, foam batting, mats, blocks or sheets, spray on-foam, or the like provided on and around a portion or substantially all of an exterior of soil chamber 120 and other portions of soil chamber system 110. In one embodiment, insulation 140 may be substantially affixed or may be removable. For example, in one embodiment, insulation 140 may include sheets of insulation that can be coupled to and removed from walls 122 and floor 124. Such an embodiment may enable simplified replacement of insulation 140, simplified construction of soil chamber system 110, and/or simplified disassembly and reassembly of soil chamber system 110 for portable transport from one location to another. In one embodiment, insulation may be formed integral with wall 122. For example, insulation 140 may be provided in central portions 122a and/or 124a. In the illustrated embodiment, soil chamber cover 126 includes a layer of insulation 140 integrally formed therein. In other embodiments, soil chamber cover 126 may include a layer of insulation 140 along with other layers or portions of soil chamber cover 126.

Soil chamber cover 126 may be configured to enclose a top/opening of soil chamber 120. Soil chamber cover 126 may inhibit the loss of heat from soil chamber 120. Soil chamber cover 126 may inhibit the transfer of substances into and out of soil chamber 120. For example, soil chamber cover 126 may provide a barrier that inhibits external debris and substances, such as rain water, from entering soil chamber 120, fluid loss from the soil to the atmosphere, and/or heat loss to the atmosphere. In the illustrated embodiment, soil chamber cover 126 includes a barrier layer 126a. Insulation 140 is positioned on top of barrier layer 126a. In one embodiment, barrier layer 126a includes a rigid or flexible structure capable of spanning the distance between walls 122. In one embodiment barrier layer 126a includes a flexible plastic or composite sheet. In one embodiment, barrier layer 126a includes a rigid structure, such as a rigid plastic, composite, or metal sheet or plate. In one embodiment, soil chamber cover 126 may be permeable, semi-permeable, or impermeable. Various levels of permeability may be used to control the transfer of substances into and out of soil chamber 120. For example soil chamber cover 126 may be permeable or semi-permeable when it is desirable for moisture to escape soil chamber 120 via cover 126. Soil chamber cover 126 may be impermeable when it is desirable for moisture to remain in soil chamber 120, and to inhibit moisture from entering soil chamber 120. For example, soil chamber cover 126 may be substantially impermeable, and thus ventilation of soil chamber 120 may be provided primarily or completely via ventilation system 114 and fluid system 116.

Soil chamber cover 126 may be removable to expose an opening in a top of soil chamber 120. In one embodiment, soil chamber cover 126 may rest on upper portion of walls 122 such that cover may be lifted, slid, or rolled off for removal. In another embodiment, soil cover may be affixed to walls 122. For example, soil chamber cover 122 may be removably affixed to soil chamber walls 122 via mechanical fasteners, such as bolts, clips, clamps or an adhesive. Soil chamber cover 126, may be lifted, slid, folded, or rolled open to expose a top opening in soil chamber 120. In one embodiment, soil chamber cover is rolled from a front end of soil chamber 120 to a rear end of soil chamber. In one embodiment, soil chamber cover 126 is not readily removable. For example, in one embodiment, soil chamber cover 126 is affixed to or formed integral with walls 122 such that it is not removable without significant effort or damage to soil chamber 120.

In the illustrated embodiment, soil chamber cover 126 does not include any heaters or vents, or thermally conducting plates. In one embodiment, soil chamber cover 126 may include heaters, vents and/or conducting plates. For example, soil chamber may include heaters and/or vents inside of or on top of barrier 126 of soil chamber cover 126. In one embodiment, barrier layer 126 or another portion of soil chamber cover 126 includes a thermally conducting layer separating the heaters and/or vent from an interior of soil chamber 120. Heaters and vents may be arranged substantially similar to those depicted and described with regard to walls 122 and floor 124. In an embodiment, heating and gas flow (e.g., vacuuming) may be provided via cover. Providing heat may inhibit condensation of contaminants on and in soil adjacent to soil chamber cover 126.

During use, soil 130 may be piled with a crown in the middle, between walls 122. In one embodiment, a soil chamber cover 126 can be draped/placed over the crown in the pile, creating a similar crown shape in soil chamber cover 126 that facilitates debris and rainwater running off toward walls 122. In one embodiment, a debris and/or runoff collection trough is provided at walls 122 to collect and channel away debris and/or runoff. For example, on one embodiment, a gutter is provided at a top interior portion of walls 122 where cover is attached to walls 122 such that rainwater can be channeled off and away from soil chamber 120.

In one embodiment, cover 126 includes a taper/slope. A taper or slope may encourage fluid and debris to shed from cover 126, as opposed to collecting and potentially sagging cover 126. In one embodiment, a slope of cover 126 extends over a single soil chamber 120. For example, cover 126 may include a rigid or flexible cover having a peak in its center that slopes to its edges. In one embodiment, a slope of cover extends over a series of adjacent soil chambers 120.

In one embodiment walls 122 and/or floor 124 may be sealed. Such an embodiment may inhibit moisture and/or gases from being transferred into or out of soil chamber 120. For example, a sealed floor 124 may enable leachate to be collected at the bottom of chamber 120 without running off or out of chamber 120 into the surrounding environment.

In one embodiment, soil chamber 120 may not include a substantial floor 124 at its base. For example, wall may be erected over land or a similar unsealed base region. In such an embodiment, soil in the chamber as well as substances in the base of soil chamber 120 may be heated. For example, the ex situ soil pile in soil chamber 120 and the in situ soil below may be heated simultaneously.

In one embodiment, soil chamber 120 may include one or more measurement devices and/or access or measurement devices. In one embodiment, measurement devices may include thermocouples. For example, in the illustrated embodiment, thermocouples 142 are positioned in walls 122, floor 124 and cover 126. Other embodiments may include any number of thermocouples or similar measurement devices or probes positioned throughout soil chamber system 110.

In one embodiment, ports 144 provide access into an interior of soil chamber 120. For example, in the illustrated embodiment, a port 144 is located in cover 126. Port 126 includes a hole that enables devices, such as a thermocouple, probe or soil sampling device, to be inserted into an interior of soil chamber 120. In one embodiment, port 144 includes a cover/plug that can be installed/uninstalled to enable access. Other embodiments may include any number of ports 144 in soil chamber system 110. For example, ports 144 may be provided in walls 122 and/or floors 124.

Embodiments may include any combination of the features described above. For example, the illustrated embodiment includes heaters, vents, and a thermally conducting layer 136 positioned in each of two side walls 122 and floor 124, and insulation 140 on an exterior. Other embodiments may include heaters, vents, or thermally conducting layer, and/or insulation in any combination of the walls (including side and end walls), floor and cover that surround chamber 120. For example, one wall may include only heaters and a thermally conducting layer, while another wall may include vents with no heaters or thermally conducting layer. In one embodiment, heaters, vents, and/or a thermally conducting layer may not be provided in walls 122 and/or floor 124. In one embodiment, one wall may include heaters and/or vents that act as contiguous soil chambers.

In one embodiment, soil chamber 120 is defined by walls 122 that completely surround it. For example, in one embodiment, soil chamber 120 includes a rectangular shape having four walls 122, including side and end walls. In another embodiment, soil chamber 122 may not be completely surrounded by walls 122. For example, in one embodiment, soil chamber 120 may include a channel defined by two parallel side walls spaced opposite and apart from one another. In such an embodiment, one or both of the end walls may not be provided. In other words, soil chamber 120 may include a channel enclosed on two sides and having two open ends, or enclosed on three sides and having one open end. Other embodiments may include any shape soil chamber. For example, soil chamber 120 may be enclosed by a single contiguous wall (e.g., having a circular shape).

In one embodiment, soil chamber 120 is positioned on or above a ground surface. For example, soil chamber may be positioned on a soil pad, a concrete pad, an asphalt pad, a parking lot, or the like. In one embodiment, soil chamber 120 may be positioned at least partially below ground level. For example, soil chamber 120 may be positioned completely or partially in a pit, hole, basement, vault or channel. For example, floor 124 may be positioned below ground level, and walls 122 may extend up to and/or above the ground surface. Such an embodiment may enable the ground to provide structural support and insulating properties to soil chamber system 110.

Figure 2C:
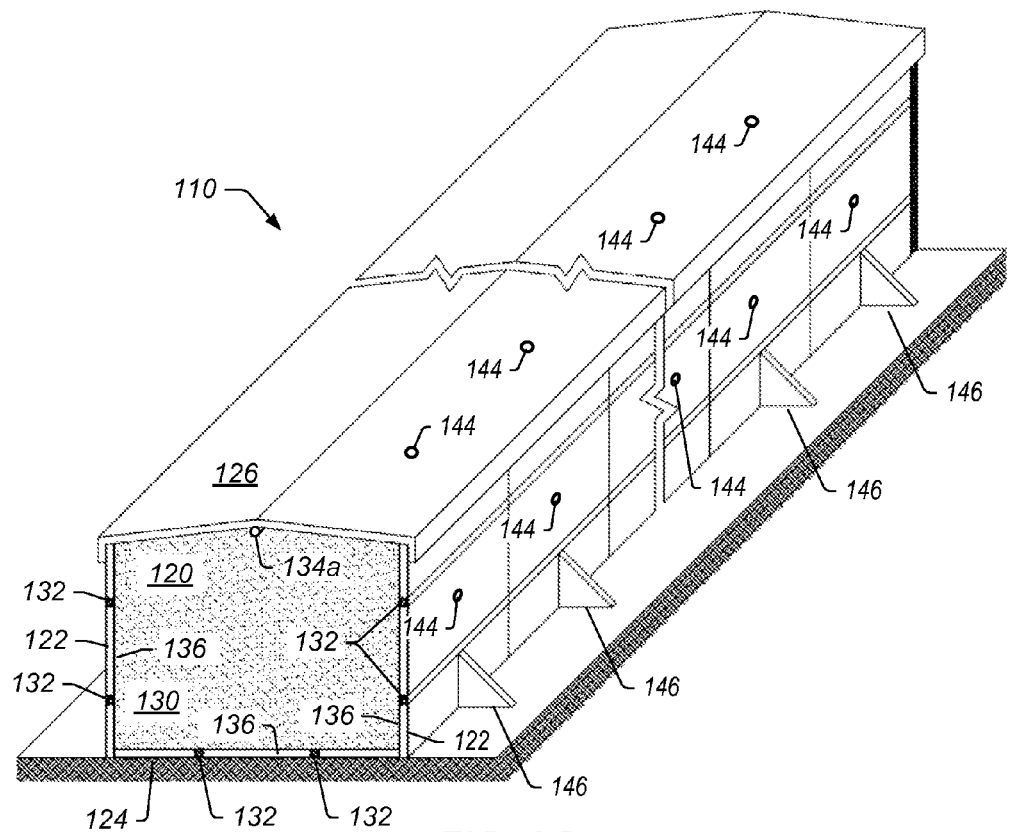
FIGS. 2B-2C illustrate the soil chamber system in accordance with one or more embodiments of the present technique.
Figure 2B:
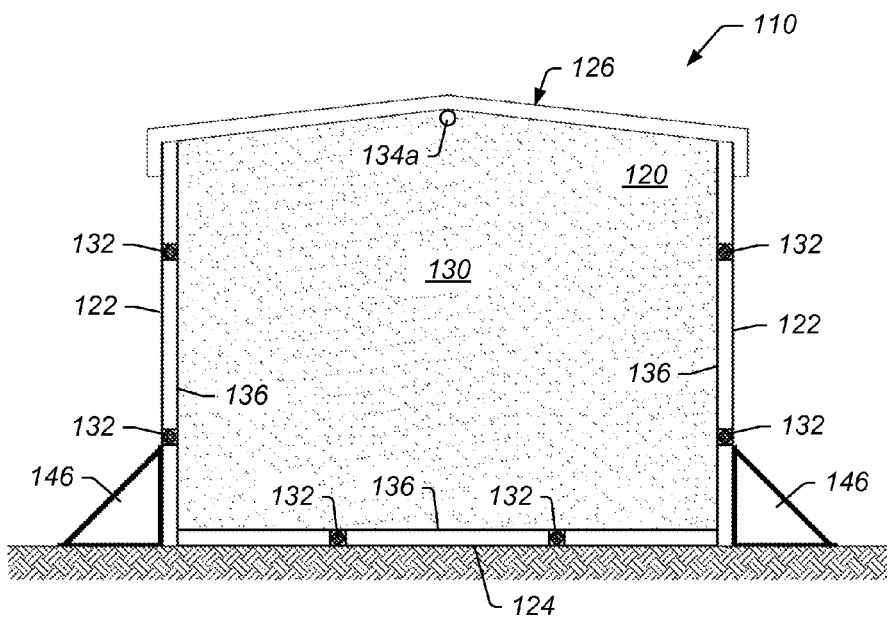

FIGS. 2B-2C illustrate soil chamber system 110 in accordance with one or more embodiments of the present technique. In the illustrated embodiment, soil chamber system 110 is positioned on a ground surface. In the illustrated embodiment, soil chamber system 110 includes a single soil chamber 120 defined by four walls (note nearest end wall not shown due to sectional view). In the illustrated embodiment, each wall 122 and floor 124 includes two heaters 132. In the illustrated embodiments, heaters 132 are spaced at increments of about one-third of the height/width of the respective walls 122 and floor 124. In the illustrated embodiment, cover 126 is tapered/sloped to include a central peak that slopes down over top edges of walls 122. The illustrated embodiment also includes multiple ports 144 positioned in walls 122 and cover 126 of soil chamber 120. Further, soil chamber 120 includes buttresses 146 positioned about the exterior of walls. Buttresses 146 may provide additional structural support to walls 122 such that they can effectively contain soil within soil chamber 120. Embodiments may also include buttresses or similar structural supports positioned in an interior of soil chamber 120. In the illustrated embodiment, a vent 134a is located in a top portion of soil 130 just below cover 126. Vent 134a may be used to vent/vacuum off-gases as they rise through soil 130. In the illustrated embodiment, soil chamber 120 is completely filled with soil 130 such that soil 130 abuts an underside of cover 126.

In another embodiment, multiple soil chamber systems 110 and/or soil chambers 120 may be provided adjacent to one another. For example, a soil chamber system 110 may include two soil chambers 120 arranged end-to-end adjacent one another. In such an embodiment, the two soil chambers 120 may share a common end wall. The end wall may include heaters, vents, thermally conducting layer(s) and/or insulation. Similarly, multiple soil chambers 120 may be provided side-by-side adjacent to one another (See FIG. 1). Further, embodiments may include an array of three or more soil chambers 120 arranged both adjacently side-by-side and end-to-end with one another. For example, four square/rectangular soil chambers may be provided in a square arrangement such that they are each share a common wall with an adjacent chambers adjacent one end and one side. Use of a common wall may decrease complexity and increase efficiency of a soil chamber system 110 by enabling a single wall and/or single set of heaters to provide heat to soil in adjacent chambers on either side of a wall.

Figure 3A:
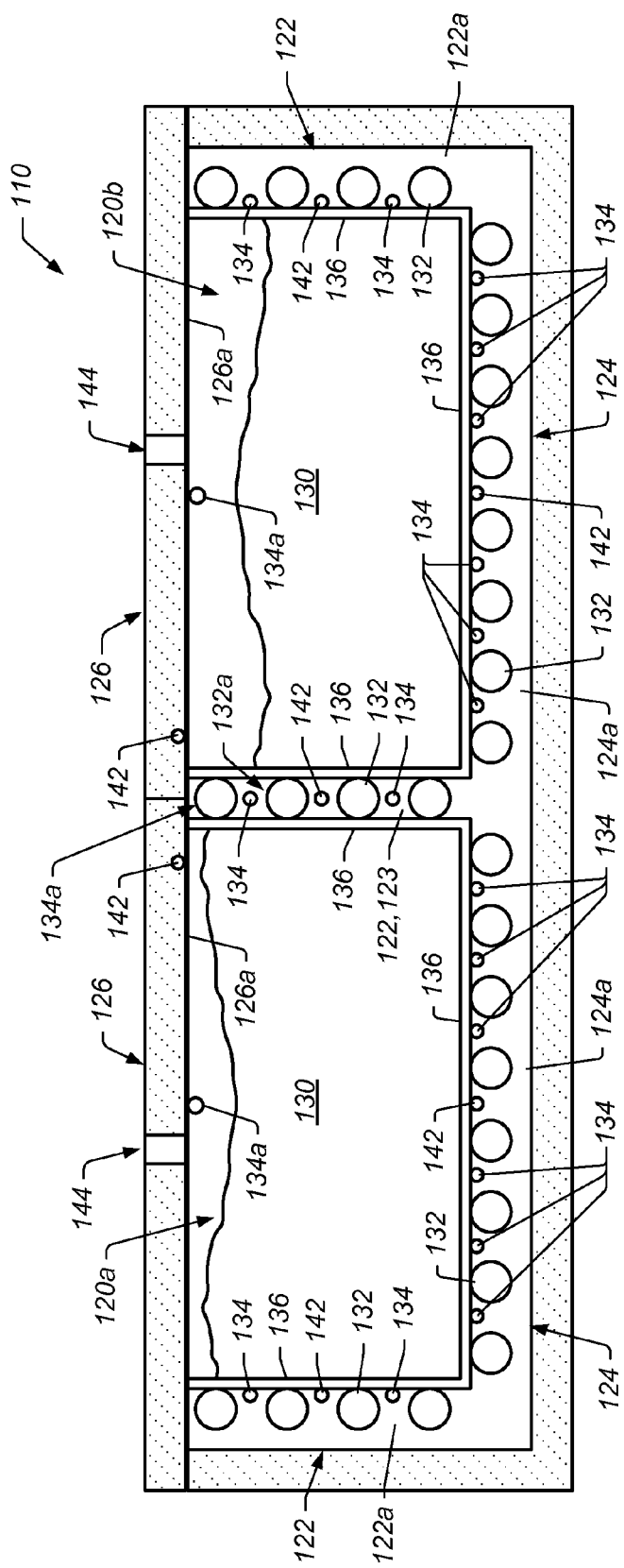
FIG. 3A is a diagram that illustrates the soil chamber system including adjacent soil chambers having a shared wall in accordance with one or more embodiments of the present technique.

FIG. 3A is a diagram that illustrates a soil chamber system 110 having adjacent soil chambers 120a and 120b having a shared/common wall 123 in accordance with one or more embodiments of the present technique. In the illustrated embodiment, two chambers 120a and 120b are arranged side-by-side having shared wall 123 provided between them. In the illustrated embodiment, shared wall 123 includes heaters 132, vents 134, and thermally conducting layers 136. Thermally conducting layers 136 are located on both sides of shared wall 123 forming an interior surface of chambers 120a and 120b. Heaters 132 and vents 134 are positioned between the two thermally conducing layers 136. Thermally conducting layers 136 may inhibit contact between soil 130 in chambers 120a and 120b. Shared wall 123 may include these and other features similar to those described above with respect to walls 122.

In the illustrated embodiment, each of heaters 132 positioned in shared wall 123 is in contact or near contact with thermally conducting layers 136. Thus, a single heater 134 may conduct heat to the two thermally conducting layers 136 simultaneously. In one embodiment, the distance between thermally conducting layers 136 may be about the same width of heater 132, such that heater 132 is in contact or near contact with one or both thermally conducting layers 136 of shared wall 123. Heaters 132 may thus provide heat to soil 130 in one or both of soil chambers 120a and 120b simultaneously. Heaters 132 that provide heat to adjacent chambers may be referred to as shared heaters. In the illustrated embodiment, a single column of shared heaters 132a are provided inside of shared wall 123.

Shared wall 123 may include one or more heaters that are arranged to provide heat to only one, but not both of the adjacent chambers. In one embodiment, heaters 132 may be provided in contact or near contact with thermally conducing layer 136 adjacent chamber 120a, but not in contact or near contact, or insulated from thermally conducing layer 136 adjacent chamber 120b, or vice versa. In one embodiment, two columns of heaters 132a may be provided, one column in contact with each of thermal conducting layers 136 adjacent soil chambers 120a and 120b, respectively. Such an arrangement may enable shared resources and structures of walls, such as the structure itself, insulation, and wiring, while still enabling control over heat being delivered to a specific chamber. For example, one chamber may be filled with soil and heated while the adjacent chamber is being emptied, filled, or cleaned for a separate remediation procedure, thus enabling alternating cycling of remediation. Similar cycling may be performed even when chambers have shared heaters.

In the illustrated embodiment, a series of vents 134 is positioned in shared wall 123. Vents 134 may service (e.g., provide gas/fluid flow) to one or both of soil chambers 120a and 120b simultaneously. Vents 134 that service adjacent chambers may be referred to as shared vents. In the illustrated embodiment, a single column of shared vents 134a are provided inside of shared wall 123.

Shared wall 123 may include one or more shared vents 134a that are arranged to provide gas/fluid flow to only one, or a combination of the adjacent chambers. In one embodiment, vents 134 may include inlets/outlets to chamber 120a or chamber 120b. In one embodiment, two columns of vents 134a may be provided, each column servicing soil chambers 120a and 120b, respectively. Such an arrangement may enable shared resources and structures of walls, such as the structure itself, insulation, and wiring, while still enabling control over gas flow to a specific chamber. For example, one chamber may be injected with gas while the adjacent chamber is provided with a vacuum to collect off-gas. Such an embodiment may be useful where two adjacent chambers are operating at different portions of a soil remediation cycle and may require different ventilation schemes.

Other portions of soil chamber system 110, such as walls 122, shared wall 123, floors 124, and soil chamber covers 126 may include features such as those described herein with respect to other embodiments. In the illustrated embodiment, two chambers are arranged side-by-side such that shared wall 123 is a shared side wall. In another embodiment, two chambers may be arranged end-to-end such that shared wall 123 is a shared end wall. Further, the illustrated embodiments includes a soil chamber system 110 including two chambers arranged adjacent one another and having a shared wall. Other embodiments, may include one or more soil chamber systems 110 including any number of soil chambers 120 arranged side-by-side, end-to-end, or in any combination thereof.

During filling and emptying of chambers 120 and/or 120a, soil may be moved away from interior wall 122. For example, if soil 130 is removed from soil chamber 120a, soil 130 in soil chamber 120b may exert a force against interior wall 122. To counteract the force, additional structural support, such as buttresses, collar ties, clamps or other temporary supports may be added at interior wall 122 and/or shared wall 123. The forces may be dealt with by certain methods of loading and unloading soil 130. For example, in one embodiment, soil for each of the chambers is unloaded in coordination to maintain complementary forces on either side of the wall. For example, instead of completely emptying one soil chamber, each soil chamber may be incrementally emptied such that soil is generally present or removed on opposite sides of interior wall 122.

Figure 3B:
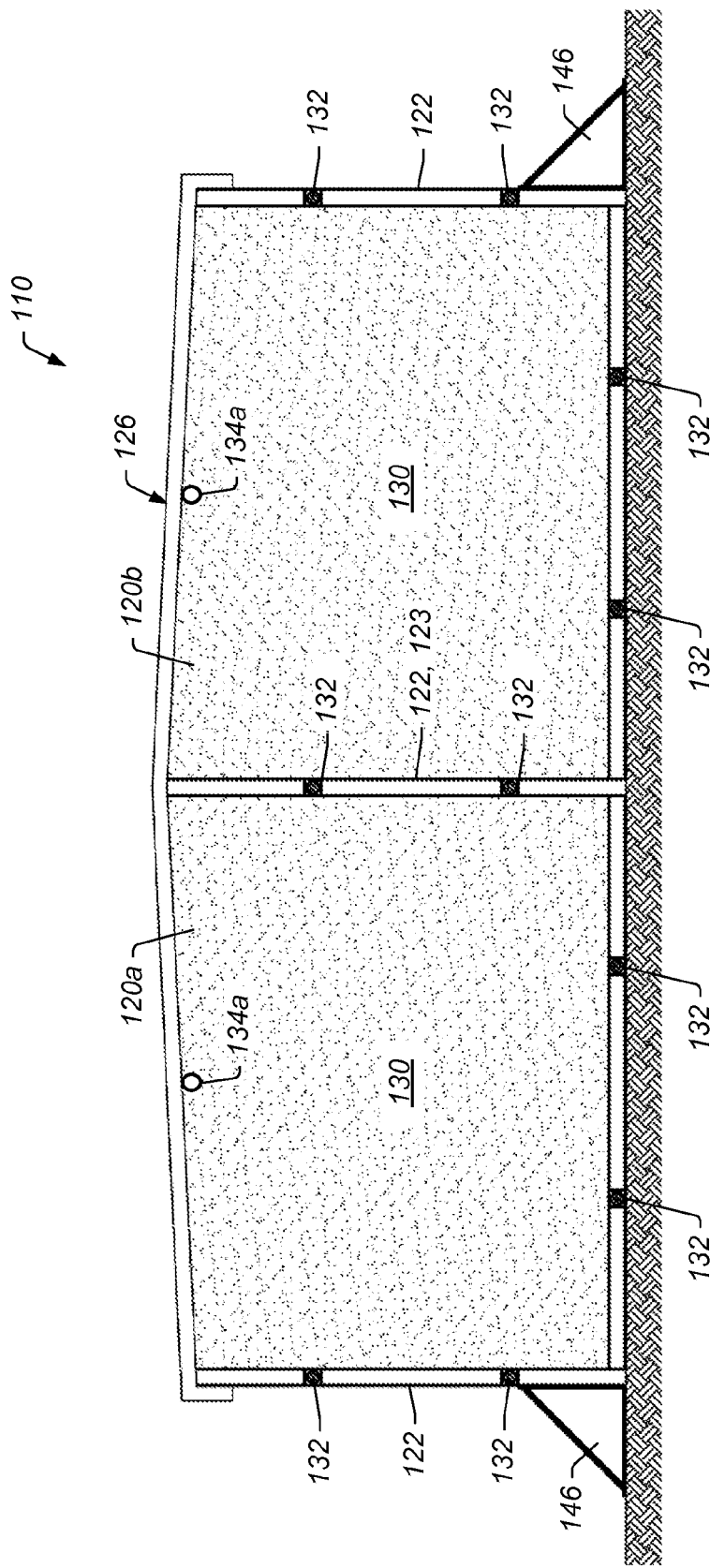
FIGS. 3B-3C illustrates the soil chamber in accordance with one or more embodiments of the present technique.
Figure 3C:
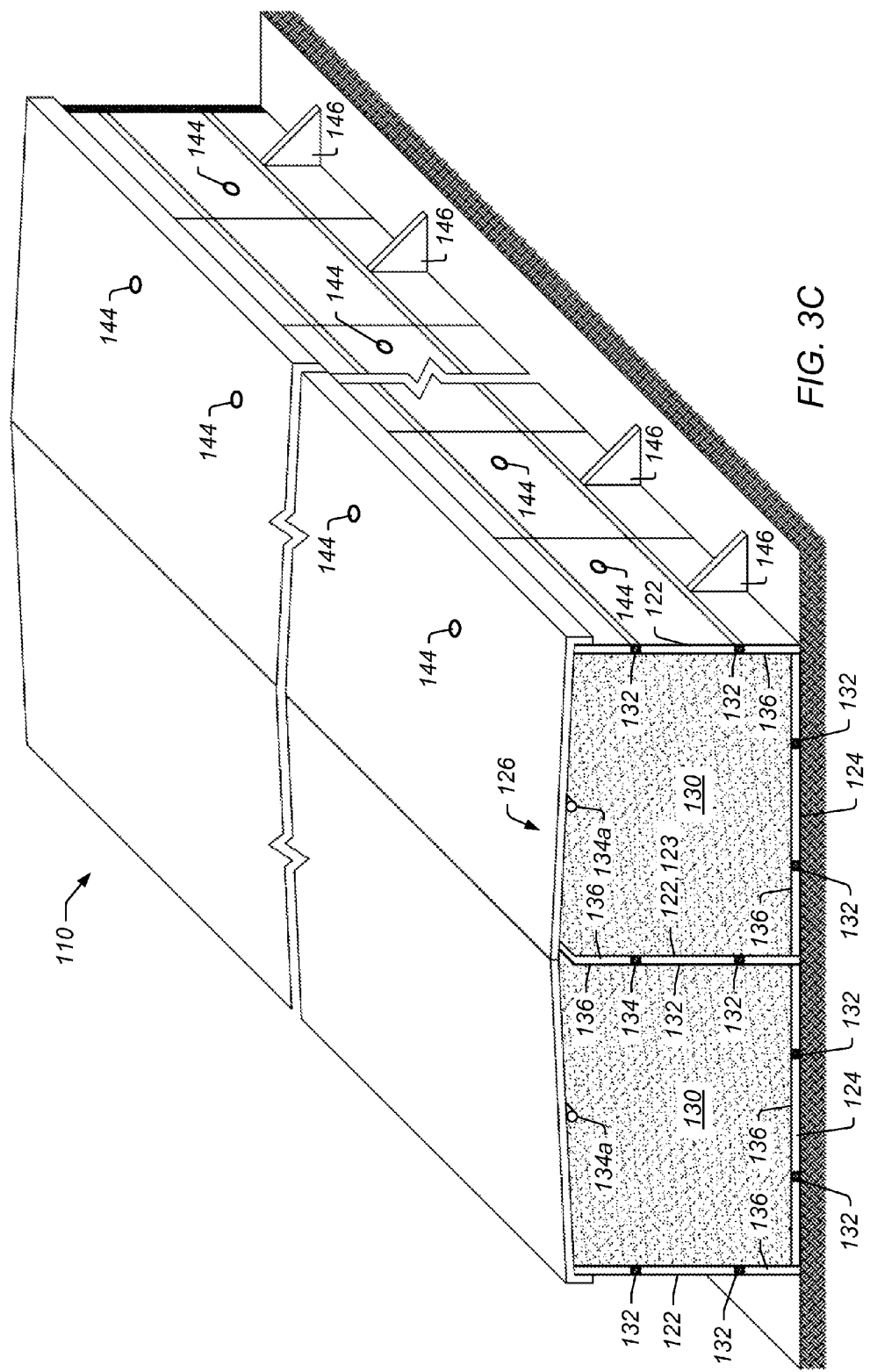

FIGS. 3B-3C illustrate soil chamber 120 in accordance with one or more embodiments of the present technique. In the illustrated embodiment, soil chamber 120 is positioned on a ground surface. In the illustrated embodiment, soil chamber system 110 includes two soil chambers 120a and 120b, each defined by four walls (note nearest end wall not shown due to sectional view). In the illustrated embodiment, each wall 122 and floor 124 includes two heaters 132. In the illustrated embodiments, heaters 132 are spaced about increments of one-third of the height/width of the respective walls 122 and floor 124. In the illustrated embodiment, a single cover 126 is provided over both soil chambers 120a and 120b. Cover 126 is tapered/sloped to include a central peak that slopes down over top edges of outside side walls 122. The illustrated embodiment also includes multiple ports 144 positioned in walls 122 and cover 126 of soil chamber system 110. Further, soil chamber system 110 includes buttresses 146 positioned about the exterior of walls. Buttresses 146 may provide additional structural support to walls 122 such that they can effectively contain soil within soil chamber 120. Embodiments may also include buttresses or similar structural supports positioned in an interior of soil chamber 120. In the illustrated embodiment, a vent 134a is located in a top portion of soil 130 just below cover 126. Vent 134a may be used to vent/vacuum off-gases as they rise through soil 130. In the illustrated embodiment, soil chamber 120 is completely filled with soil 130 such that soil 130 abuts an underside of cover 126. In one embodiment, treatment cells (e.g., soil chambers) may be modular such that they can be constructed, transported or otherwise used independent of one another or coupled to one another. For example, one or more soil chambers (e.g., soil chambers 120a and 120b) may include modular connection joints for mechanical, electrical and/or fluid conveyance components to enable rapid deployment, assembly and disassembly of one or more soil chambers. In such an embodiment, one or more of the modular soil chambers may be used in a soil chamber system.

Moving soil into and out of the soil chamber typically creates its own set of difficulties. For example, where large amounts of soil are being remediated, soil loading vehicles and equipment typically need to be used to transport soil into and out of the soil chamber. For example, a front end loader, bulldozer, dump truck or conveyor may be used to deposit contaminated soil into the soil chamber before remediation and used to remove the remediated soil after remediation. Accordingly, it is desirable to reduce the number and amount of obstructions within the soil chamber such that loading vehicles and equipment can easily deposit and remove the soil without having to maneuver around interior piping and appurtenances within the soil chamber. Further, it is generally desirable to provide access to the soil chamber such that soil loading vehicles and equipment can easily deposit soil in and remove the soil from the soil chamber. For example, in one embodiment, the soil chamber may include a permanent opening, such as a three sided rectangular soil chamber having an open end with no wall or a two-sided channel forming a soil chamber and having no end walls, such that loading vehicles and equipment may drive into and through the soil chamber. In one embodiment, the soil chamber may include a portion of the walls that moves (e.g., slide or swing open) to allow loading vehicles and equipment to access (e.g., drive in or through) the soil chamber. For example one or more end walls of a rectangular chamber that completely enclose the sides of the soil chamber may be swung, slid or folded to provide an opening into the soil chamber. Such an opening may enable soil loading vehicles and equipment, a front end loader, bulldozer, dump truck or conveyor, to be moved into the soil chamber. In an embodiment in which heaters are located in the walls and/or floors, and no heaters or similar obstructions are present in the interior of the soil chamber, the loading vehicles and equipment may move freely with little or no obstruction, reducing the time for soil loading and unloading, thereby reducing the overall time and cost of a soil remediation cycle.

Figure 4A:
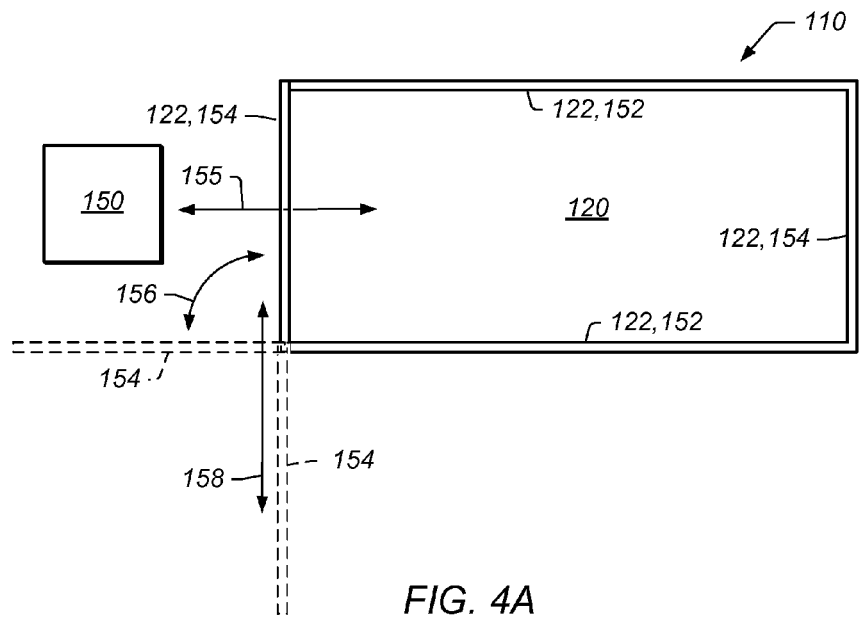
FIG. 4A is a diagram that illustrates the soil chamber system including at least a portion of the walls that is movable in accordance with one or more embodiments of the present technique.

FIG. 4A is a diagram that illustrates a plan view of soil chamber system 110 including at least a portion of the walls 122 that is movable, in accordance with one or more embodiments of the present technique. Moving a portion of the walls 122 may enable soil moving vehicles and/or equipment 150 to access an interior of soil chamber 120. In the illustrated embodiment, soil chamber system 110 includes a rectangular soil chamber having four walls 122. Walls 122 include two side walls 152 and two end walls 154. Side walls 152 are positioned parallel to one another and spaced apart from one another to form a channel between them that includes soil chamber 120. End walls 154 span the distance between ends of side walls 152. Side walls 152 and end walls 154 may include features such as those described herein with regard to walls 122. In the illustrated embodiment, an end wall 154 is movable from a closed position to an open position. In the closed position, end wall closes the gap between side walls 152 to enclose that portion of soil chamber 120. In the closed position, end wall 154 may provide a physical barrier to retain soil, may inhibit the loss of heat from soil in soil chamber 120, or may provide heat to the soil in soil chamber 120. In the open position, end wall 154 may be moved to provide an opening into soil chamber 120. The provided opening may enable inspection of an interior region of soil chamber 120 and/or may enable soil loading equipment 150 access to an interior of soil chamber 120 such that soil can be provided in or removed from soil chamber 120. For example, soil moving vehicles and/or equipment 150 may travel into and out of soil chamber 120 in the direction of arrow 155. In one embodiment, end walls 154 may be rotated between the opened and closed positions as indicated by arrow 156. For example, end wall 154 may be hinged to side wall 152. In one embodiment, end wall 154 may be slid between the opened and closed positions as indicated by arrow 158. For example, end wall 154 may slide on tracks or guides parallel to its direction of travel, sideways or upward. Other embodiments may include folding or swinging of end wall in any variety of manners. In one embodiment, additional moveable wall portions may be provided. For example, both ends wall 154 may be movable. Such an arrangement may enable soil moving vehicles and equipment 150 to pass completely through soil chamber 120. In one embodiment, a dump truck can drive in a first end of soil chamber 120, dump a load of contaminated soil, and continue to drive through the second end of soil chamber 120 without having to turn around.

Figure 4B:
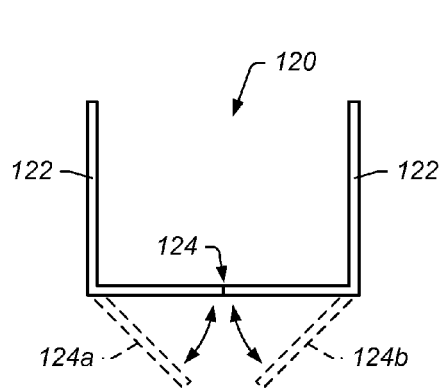
FIG. 4B is a diagram that illustrates a movable floor in accordance with one or more embodiments of the present technique.

FIG. 4B is a diagram of an end view of soil chamber 120 that illustrates a movable floor in accordance with one or more embodiments of the present technique. In the illustrated embodiment, floor 124 includes two movable floor portions 124a and 124b. As depicted, floor portions 124a and 124b may rotate downward to enable soil to be removed through a bottom of chamber 120. For example, soil may be loaded into a soil chamber 120 with floor 124 closed, the soil heated/treated, and floor 124 swung open to allow soil to pour out of soil chamber 120. Such an embodiment may include soil chamber system 110 being elevated such that soil 130 can drop from soil chamber 120. In one embodiment, soil chamber may be elevated such that a truck, railcar, conveyor belt or similar loading device can be positioned underneath floor 124 to accept the falling soil 130. In an embodiment in which soil chamber system 110 is portable, soil chamber 120 may be moved and positioned over a deposit area, and floor 124 opened to dump soil 130 at the deposit area.

Certain components of soil remediation system 110 may be housed in one or more non-movable walls. For example, in one embodiment, an end wall 154 may house ventilation system 114, fluid system 116, and/or control system 112. End wall 154 may also include manifolds and similar connections to heaters 132, vents 134, and the like. End wall 154 may be movable, such that connections can be left in place and do not have to be reestablished each time the wall is moved. Other walls 122 may similarly house components.

Soil remediation system 100 may be provided as a permanent or semi-permanent fixture or may be provided as a portable unit. For example, where remediation system 100 is permanent or semi-permanent, soil remediation system 100 may be constructed on-site or otherwise provided to site such that is not readily movable. In another embodiment, soil remediation system 100 may be portable. For example, soil remediation system 100 may include a portable trailer, container or skid that includes some, substantially all or all of the components of soil remediation system 100. For example, soil remediation system 100 may include a self-contained structure/container that can be towed from one site to another. Portability may increase the flexibility of the described technique by enabling scalability of soil remediation. For example, any number of soil remediation systems 100 can be provided or removed from a site with little to no construction effort and lead time.

Figure 5:
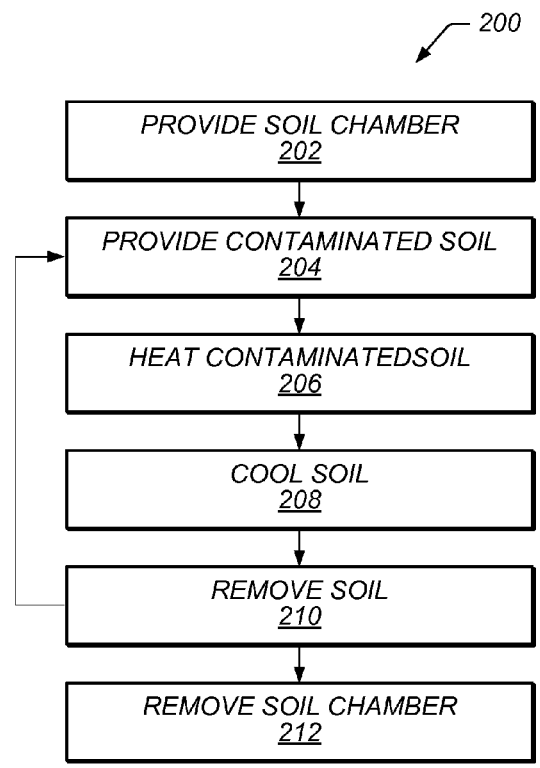
FIG. 5 is a flow chart that illustrates a method of remediating contaminated soil in accordance with one or more embodiments of the present technique.

Turning now to FIG. 5, provided is a method 200 of remediating contaminated soil in accordance with one or more embodiments of the present technique. Method 200 may be implemented using various embodiments of soil remediation system 100 described herein. In the illustrated embodiment, method 200 includes providing a soil chamber, as depicted at block 202. In one embodiment, providing a soil chamber includes providing one or more soil chambers capable of heating contaminated soil for soil remediation. In one embodiment, providing a soil chamber includes providing one or more permanent, semi-permanent, or portable soil chamber systems. In one embodiment, providing a soil chamber includes providing a plurality of separate soil chambers and/or a soil chamber system including two or more adjacent soil chambers having a shared wall.

Method 200 also includes providing contaminated soil, as depicted at block 204. In one embodiment, providing contaminated soil includes moving excavated soil to a soil chamber of soil remediation system. For example, where soil remediation system is provided on site for an ex situ remediation, soil is excavated and transported to the soil remediation system located on site. In another embodiment, contaminated soil may be excavated at one site and transported to a soil remediation system located offsite. In one embodiment, providing contaminated soil may include providing soil into a soil chamber via an opening in a side or end wall of the soil chamber. For example, soil loading vehicles and equipment may move and deposit soil into the soil chamber via an opening in its side/end walls. In one embodiment, the opening is created by moving/opening a wall portion. For example, an end wall may be rotated or slid open. In one embodiment, the opening may include a portion of the soil chamber not having a wall. Other embodiments may include the use of conveyors or similar equipment to provide soil into the soil chamber without making use of an opening in the wall of the soil chamber. For example, a soil chamber cover may be removed, and soil deposited into the soil chamber from above. Once the soil chamber has been filled sufficiently for remediation, openings in the soil chamber may be closed. For example, moveable wall portions may be closed and/or a soil chamber cover may be placed over the soil chamber. The soil may be temporarily stored within the chamber prior to or following treatment.

In one embodiment, providing contaminated soil includes providing soil in containers into the soil chamber. For example, sacks of contaminated soil may be provided into the soil chamber. Sacks of soil may include "super sacks" of soil. Super sacks may include heavy-duty bulk sacks for the containment and transport of contaminated soil. For example, super sacks may include four-foot by four-foot rectangular sacks capable of containing up to about three-thousand pounds of soil or more. As another example, drums of contaminated soil may be provided into the soil chamber, and the spaces between the drums filled with soil or other porous media to aid thermal conduction. Super sacks or drums may enable simplified transport of contaminated soil. In one embodiment, the entire super sack, including the soil and the super sack container material, are deposited into the soil chamber. The high temperatures may melt and/or dissolve the super sack container material during heating. In another embodiment, the entire drum, including the soil and drum with cover are deposited into the soil chamber or the drum covers may be loosened or punctured after placement in soil chamber to prevent over pressurization. Not having to open the super sack or drum may obviate the need for additional dust and/or odor control measures during filling of the soil chamber.

Method 200 also includes heating the contaminated soil, as depicted at block 206. In one embodiment, heating the contaminated soil includes providing heat to the soil in the soil chamber via heaters. In one embodiment, heaters located in the walls and/or floor of the chamber transfer heat to a thermally conducting layer, which in turn distributes and transfers the heat to the soil. In one embodiment, heat may be provided via similar heaters and/or thermally conducting plates located in a portion of all of the walls, a floor, and/or a soil chamber cover of the soil chamber. In one embodiment, heating the contaminated soil may include providing gas or fluid into the soil chamber. Gas and fluids may be provided via a ventilation system and/or a fluid system. The gas or fluids may be delivered via vents located in the walls, the floor, or the soil chamber cover of the soil chamber system. In one embodiment, heating the contaminated soil includes extracting vapors and/or liquids from the soil chamber.

In one embodiment, heat from one soil chamber or soil chamber system is recycled. For example, in one embodiment, heated gases or liquids from one soil chamber or soil chamber system are routed to another soil chamber or soil chamber systems where the heated gases or liquids are used to heat soil contained in the other soil chamber or soil chamber system.

Heating the contaminated soil may include heating the soil and/or the soil chamber to a target temperature. In one embodiment, thermally conducting layers of the soil chamber system are heated to temperatures between about 300° C. and 700° C. This may create a hot, dry reaction zone along at least the walls and the bottom of the soil, where destruction reactions may contribute to lowering the COC concentrations. The use of a thermally conductive layer may distribute heat to the soil to reduce the likelihood of cool, untreated zones within or at the edges of the treated soil volume, thereby facilitating uniform heating and treatment of the soil.

In one embodiment, the target temperature is based on the highest boiling point COC that is known to be present in the soil. The soil temperature may be elevated enough so that the vapor pressure of the highest boiling-point compound increases to a point where it behaves as if it were a volatile compound. The compound may be extracted as a gas and removed from the soil and/or soil chamber and transported to an off-gas treatment system for polishing. For example, if a Polycyclic Aromatic Hydrocarbon (PAH) contaminated sediment contained both naphthalene having a boiling point of about 218° C., and other higher boiling point PAHs such as Benzo(a)Pyrene (B(a)P) having a boiling point of about 495° C., and if it were necessary to achieve low post-treatment concentrations for both naphthalene and B(a)P, the target temperature may be established based on the boiling point of the higher-boiling compound, B(a)P. A target temperature of 325° C. is typically considered effective for removal of a wide range of high-boiling SVOCs including B(a)P, Polychlorinated Biphenyls (PCBs) and Polychlorinated Dibenzo-Dioxins and -Furans (PCDD/Fs), Pentachlorophenols (PCPs), and chlorinated pesticides or other Persistent Organic Pollutants (POPs) such as Dieldrin and Chlordane. For many VOCs, target temperatures may be below or at the boiling point of water. In one embodiment, heating the soil to a target temperature in a range of about 50° C. to about 500° C. is desirable. In one embodiment, heating the soil to a target temperature in a range of about 300° C. to about 400° C. is desirable.

In one embodiment, heating the contaminated soil include providing and or monitoring various sensors. For example, thermocouples and/or soil or vapor sampling devices may be accessed, inserted into, and/or removed, via a port in the soil chamber system. In one embodiment, sensors or probes may be provided integrally within soil chamber system 110 such that measurements can be acquired and monitored continuously and without having to access an interior of chamber 120.

Method 200 also includes cooling the soil, as depicted at block 208. In one embodiment, cooling the soil may include bringing the soil down to a temperature where it can be handled. For example, the soil may be cooled to about or below 150° C. so that it can be handled by soil loading vehicles and equipment, and/or loading personnel. In one embodiment, cooling the soil includes spraying water or another cooling substance on top of the soil pile to quench the high temperatures. In one embodiment, cooling gas or liquids may be delivered via a ventilation system, a fluid system, and or vents located in the walls, floor, or cover of the soil chamber. In one embodiment, a fluid may be delivered via a water sprinkler system. In some embodiments, soil may be cooled over several days.

Method 200 also includes removing soil, as depicted at block 210. In one embodiment, removing the soil includes removing the now remediated soil from the soil chamber. In one embodiment, a portion of the soil chamber wall may be moved from a closed to an open position and soil loading vehicle and equipment may be moved through the resulting opening in the wall to access, load and remove the remediated soil from the soil chamber. Where components of the soil remediation system are provided in the walls/floors as opposed to in an interior of the soil chamber, soil may be removed without having to remove much or any components from the interior of the chamber. For example, heaters and vents may not be removed because they are located in the walls, separated from the interior of the soil chamber. In an embodiment that includes two or more soil chambers arranged adjacent one another, soil for each of the chambers is unloaded in coordination to maintain complementary forces on either side of the wall. For example, instead of completely emptying one soil chamber, each soil chamber may be incrementally emptied such that soil is generally present or removed on opposite sides of an interior wall. In one embodiment, a cover may be removed (e.g., moved or rolled off) to enable equipment to access and unload the remediated soil. In one embodiment, removing soil may include opening a bottom floor of soil chamber to enable soil to be dumped from the soil chamber. In one embodiment, the remediated soil may be replaced into an area where contaminated soil has been excavated.

In one embodiment, once the remediated soil is removed, the soil chamber may be prepared and used for the remediation of another batch of contaminated soil. For example, the remediation method may return to providing contaminated soil, as depicted at block 204. The steps of heating, cooling and removing the soil may once again be accomplished. Such a cycle may be continued until soil remediation is no longer needed, for example, once all of the soil at a site has been remediated or the soil remediation system 100 is to be used at another location.

Method 200 also includes removing the soil chamber, as depicted at block 212. In one embodiment removing the soil chamber may include disassembly and/or removal of the soil remediation system, including the soil chamber. Although not completed after each soil remediation cycle, the soil remediation system may be disassembled and/or removed from a site when soil remediation is complete and/or the soil remediation system is no longer needed. In one embodiment, at least a portion of the soil remediation system may be portable, and removing the soil chamber may include towing away at least the portable portion of the soil remediation system. In one embodiment, step 212 may be omitted where soil treatment system 100 is a fixed, permanently or semi-permanently installed facility.

In one embodiment, one or more steps of method 200 may be performed at or nearly at the same time. Where multiple soil chamber systems and/or soil chambers are available at a site, more than one cycle may be performed simultaneously For example, where a soil chamber system includes two soil chambers, they can be alternated in use. In other words, a first chamber may be heating the soil while a second chamber is being emptied and reloaded. When the first chamber has completed the remediation heating and cooling, it may be unloaded and reloaded while the second chamber is in the process of heating the contaminated soil. Use of multiple chambers in an alternating cycle may enable an increased throughput as simultaneous cycles may be performed without having to wait for one cycle to finish before a chamber can be emptied and reloaded, thus making more efficient use of electrical and process equipment, as well as loading/unloading equipment and labor.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to. As used in this specification, the singular forms "a", "an" and "the" include plural referents unless the content clearly indicates otherwise. Thus, for example, reference to "a heater" includes a combination of two or more heaters.

What is claimed is:

1. A contaminated soil treatment system, comprising:
a soil chamber comprising:
one or more walls and at least one floor;
at least one heater attached to or inside of at least one of the walls; and
at least one heater coupled to or in the floor;
wherein two or more of the walls enclose an interior of the soil chamber, and wherein at least one of the walls is configured to move between a closed position during heating of the soil chamber, and an open position that allows a soil moving vehicle to access an interior of the soil chamber to provide or remove soil to and from the soil chamber, wherein the at least one wall heater and the at least one floor heater provide heat that transfers from the heaters to a portion of the wall and a portion of the floor, and then to the contaminated soil in the soil chamber.

2. The contaminated soil treatment system of claim 1, wherein the soil chamber further comprises:
at least one cover;
at least one vapor collection pipe positioned adjacent the at least one cover; and
at least one fluid injection/extraction pipe or screen adjacent to the interior of the soil chamber.

3. The contaminated soil treatment system of claim 1, wherein at least one of the walls and/or the floor of the soil chamber comprises a thermally conductive material configured to transfer heat from the wall heater and/or the floor heater to an interior of the soil chamber.

4. The contaminated soil treatment system of claim 3, wherein the thermally conductive material comprises a substantially planar metal plate, sheet, or layer.

5. The contaminated soil treatment system of claim 3, wherein at least a portion of the thermally conductive material is configured to be positioned between at least one of the heaters and soil provided in an interior of the soil chamber during use.

6. The contaminated soil treatment system of claim 3, wherein at least one wall comprises two substantially elongated heaters, wherein at least a portion of the thermally conductive material is configured to be positioned between at least one of the two substantially elongated heaters and soil provided in an interior of the soil chamber during use, and wherein the thermally conductive material is configured to transmit heat from the two substantially elongated heaters to the soil during use.

7. The contaminated soil treatment system of claim 1, wherein a portion of the at least one of the walls inhibits contact between at least one or more of the heaters, and soil provided in an interior of the soil chamber during use.

8. The contaminated soil treatment system of claim 1, wherein the at least one wall heater and/or the at least one floor heater comprises a substantially elongated heating element.

9. The contaminated soil treatment system of claim 1, wherein at least two of the walls are spaced a distance apart from one another to define a channel for the deposition of soil.

10. The contaminated soil treatment system of claim 1, wherein the soil chamber is at least two meters wide and at least one meter high.

11. The contaminated soil treatment system of claim 1, further comprising four walls, wherein the four walls are arranged to enclose at least a portion of the soil chamber.

12. The contaminated soil treatment system of claim 1, wherein at least 10% of an interior surface of at least one wall of the soil chamber comprises thermally conductive material.

13. The contaminated soil treatment system of claim 1, further comprising a second soil chamber adjacent to the soil chamber, wherein the two soil chambers are separated by a shared wall.

14. The contaminated soil treatment system of claim 1, wherein an interior of the soil chamber is defined by interior surfaces of the at least one wall, a floor and a cover, and wherein a majority of heat provided to the soil chamber is configured to originate from one or more heaters that are separated from the interior of the soil chamber by one or more heat conducting plates.

15. The contaminated soil treatment system of claim 1, further comprising a gas input system configured to allow gas to enter an interior of the soil chamber during use.

16. The contaminated soil treatment system of claim 15, wherein the gas input system comprises at least one of a compressor, low pressure blower, or an open vent and conduit connected to one or more gas inlets of the soil chamber.

17. The soil treatment system of claim 1, further comprising a gas outlet system configured to allow gas and/or vapors to exit from an interior of the soil chamber during use.

18. The contaminated soil treatment system of claim 1, further comprising insulation coupled to an exterior of the soil chamber during use.

19. A contaminated soil treatment system, comprising:
a soil chamber configured to contain soil during use, comprising at least two walls, that enclose an interior portion of the soil chamber, wherein the at least one of the two walls comprises:
at least two substantially elongated heaters; and
one or more heat conducting plates positioned between one or more of the substantially elongated heaters and the interior of the chamber such that one or more of the substantially elongated heaters is in contact or near contact with the heat conducting plates,
wherein a majority of heat provided to the soil chamber originates from one or more of the substantially elongated heaters that are separated from the interior of the soil chamber by one or more heat conducting plates, and
wherein at least one of the walls is configured to move between a closed position during heating of the soil chamber, and an open position that allows a soil moving vehicle to access an interior of the soil chamber to provide or remove soil to and from the soil chamber.

20. The contaminated soil treatment system of claim 19, wherein the heat conducting plates comprise a substantially planar metal plate or sheet.

21. The contaminated soil treatment system of claim 19, wherein at least one of the walls inhibits contact between one or more of the substantially elongated heaters and soil provided in the soil chamber.

22. The contaminated soil treatment system of claim 19, wherein at least 10% of an interior surface of at least one of the walls comprises one or more heat conducting plates.

23. The contaminated soil treatment system of claim 19, further comprising a floor having at least one substantially elongated floor heater coupled to or in the floor, wherein the floor comprises one or more heat conducting plates positioned between one or more of the substantially elongated floor heaters and an interior of the chamber configured to contain soil during use, and wherein the one or more heat conducting plates are configured to transfer heat from one or more of the substantially elongated floor heaters to an interior of the soil chamber.

* * * * *

UNITED STATES PATENT AND TRADEMARK OFFICE
CERTIFICATE OF CORRECTION

| | |
|---|---|
| PATENT NO. | : 8,562,252 B2 |
| APPLICATION NO. | : 13/403780 |
| DATED | : October 22, 2013 |
| INVENTOR(S) | : Baker et al. |

Page 1 of 1

It is certified that error appears in the above-identified patent and that said Letters Patent is hereby corrected as shown below:

On the Title Page

Item (73) Assignee:

Please delete "Fitchburg, MA" and substitute therefor --Gardner, MA--.

Signed and Sealed this
Twelfth Day of August, 2014

Michelle K. Lee
*Deputy Director of the United States Patent and Trademark Office*